United States Patent

[11] 3,615,646

| [72] | Inventors | William H. Neely<br>Indianapolis;<br>John C. Calhoun, Indianapolis; George C. Kolb, Indianapolis; Edward S. Lindley, Beech Grove, all of Ind. |
|---|---|---|
| [21] | Appl. No. | 799,586 |
| [22] | Filed | Feb. 17, 1969 |
| [45] | Patented | Oct. 26, 1971 |
| [73] | Assignee | Stokely Van Camp, Inc.<br>Indianapolis, Ind. |

[54] FOOD PACKAGE AND PROCESS
11 Claims, 2 Drawing Figs.

[52] U.S. Cl.................................................. 99/1,
99/171 H, 99/193
[51] Int. Cl......................................................... B65d 81/34
[50] Field of Search............................................ 99/171 H,
192, 1

[56] References Cited
UNITED STATES PATENTS
2,504,869  4/1950  Noyes............................. 99/192

| 2,633,284 | 3/1953 | Moffett et al.................. | 99/171 H X |
| 2,674,536 | 4/1954 | Fisher............................. | 99/171 H X |
| 2,850,391 | 9/1958 | Gunsberg....................... | 99/171 H |
| 3,031,309 | 4/1962 | Bogner et al.................. | 99/171 H |
| 3,144,194 | 8/1964 | Cartwright..................... | 99/171 UX |
| 3,281,051 | 10/1966 | O'Brien et al................. | 99/192 X |
| 3,287,140 | 11/1966 | Brussell......................... | 99/171 UX |

*Primary Examiner*—Frank W. Lutter
*Assistant Examiner*—William L. Mentlik
*Attorney*—Woodard, Weikart, Emhardt and Naughton ABSTRACT: This invention is concerned with a frozen food package which generally comprises a sheet metal tray and a paper composite sheet top which is crimped to the tray. The bottom of the tray is covered with a carefully controlled amount of cooking liquid. The overall package has a critical moisture content. Over this cooking liquid is positioned a controlled amount of individually frozen or chopped vegetable in discrete particles. When the composite package is placed over a heat source, the contents are quickly heated to a palatable temperature without burning or charring.

PATENTED OCT 26 1971 3,615,646

INVENTOR
WILLIAM H. NEELY
JOHN C. CALHOUN
GEORGE C. KOLB
EDWARD S. LINDLEY
BY
Woodard, Weikart, Emhardt & Naughton
ATTORNEYS

FOOD PACKAGE AND PROCESS

BACKGROUND OF THE INVENTION

This invention is concerned with a concept for a frozen food package consisting of frozen vegetables and a cooking liquid in a cooking container, and a process which utilizes the frozen food container of this invention as the one and same container for cooking and serving.

In recent years we have noted the tremendous acceptance that the public has given to frozen foods especially frozen vegetables, Whether such vegetables are packed as they are picked and processed or they are formulated into convenient foods such as those packed in plastic pouches, their acceptance, nevertheless, has been quite good. Next to freshly picked vegetables, the frozen food vegetables have achieved the degree of excellence and quality which the housewife wishes to purchase for her family. As improvements in frozen foods we have noted the emergence and acceptance of convenience versions of the frozen vegetables which are ready to heat. Formulations and recipes have been marketed, packed in plastic pouches, which can be heated and served to the family. Such products are time savers and convenience items and as such command a premium price.

In the prior art, conventional frozen vegetables are generally shipped and sold in one container and cooked in another container. The usual situation is to sell frozen vegetables in small wax-coated kraft paper cartons. Prior to usage, the contents of the carton are removed and immersed in boiling water to effect cooking and to heat the same to a palatable temperature. This general procedure is disadvantageous in that time has to be allowed to heat boiling water, and after the vegetables are immersed therein, the water has to be reheated to a boil. Likewise, this process is less desirable in that a separate container has to be provided for boiling water, and there is a need for a separate serving container. Finally, this prior art procedure is less desirable due to the fact that the frozen foods in question are immersed in boiling water during their thawing and heating cycle. Due to this immersion, the vegetables in question loss a significant portion of their flavor. Likewise, the color of the vegetable is detrimentally affected, and a large percentage of the mineral and vitamin content often goes down the drain with the discarded heating water.

Generally, it could be stated that the vast majority of shipping containers, as used in the prior art for frozen vegetables, are not suitable for use as cooking vessels, and likewise, are not suitable for use as serving vessel. In contrast, this invention is concerned with a frozen food package wherein the frozen food can be heated to a palatable temperature and served in the original shipping container. In this connection, it is noteworthy that the elapsed time from the freezer to the table when the frozen food package of this invention is utilized can be approximately one-half that of the prior art processes.

In recent years a modification of the cook-in-the-container concept has achieved some consumer acceptance in the from of frozen vegetables in sauce which are sealed in thermoplastic bags, which usually contain one or more portions. These thermoplastic bags are, in turn, individually shipped in wax-coated cartons. When a consumer is desirous of utilizing the frozen food so shipped, she opens the wax-coated carton and inserts the thermoplastic bag containing the frozen food into boiling water. While this packaging concept allows the housewife to cook in the shipping container, it is not possible to serve the food in the container of this concept, as thermoplastic bags are not suitable for table use. This procedure is also undesirable in that boiling water must be prepared, and this water must be reheated to boiling to account for the cooling effect as the frozen articles are immersed therein. The net result of these heating problems is that the total time from freezer to table is unduly long, usually on the order from 20 to 30 minutes. Also in this packaging concept there is a need for a least two auxiliary vessels, namely a vessel in which to boil water and a vessel in which to serve the product.

From the above discussion, it can be seen that the prior art packaging concepts for frozen foods are less desirable in that there is a need for at least two other auxiliary vessels. Likewise, the cooking processes which are inherent to the prior art packages consume on inordinate amount of time from the freezer to the table. Finally, the prior art concepts are undesirable because in many instances the flavor, color, mineral and vitamin content of the food product are detrimentally affected in the thawing and heating sequence.

SUMMARY OF THE INVENTION

In accordance with the packaging concept and process of this invention, it is possible to ship, heat, and serve frozen foods all in the same container. Because the container of this invention is multiple purpose, saving in time and money to the consumer are possible. Other advantages are possible which will become evident to those versed in the art as they see the scope of the invention.

The primary object of this invention is a composite food container which will permit the consumer to cook frozen food over a direct heat source and in a minimum of time have a product ready to eat.

Still another object of this invention is a container and packaging concept wherein frozen foods can be packed, shipped, cooked and served all in the same container.

Another object of this invention is a composite food container wherein due to the relationship and the amount of the cooking liquid and frozen food present in said container, it is possible to cook the contents over a direct heat source in a minimum of time.

Another object of this invention is a frozen food container and cooking process wherein the flavor, color, mineral and vitamin content of the frozen food are preserved during the heating and cooking process.

Still another object of this invention is a composite food container and process which is more convenient for the ultimate consumer.

Finally, the objects of this invention include all the other novel features which will be obvious from the specification and claims at hand and constitute and improvement in the art.

BRIEF DESCRIPTION OF THE DRAWINGS

Other features, objects and advantages of this invention will be understood from the detailed description of the preferred embodiment and from the drawings, in which.

DESCRIPTION OF THE PREFERRED EMBODIMENT

Figure 2:
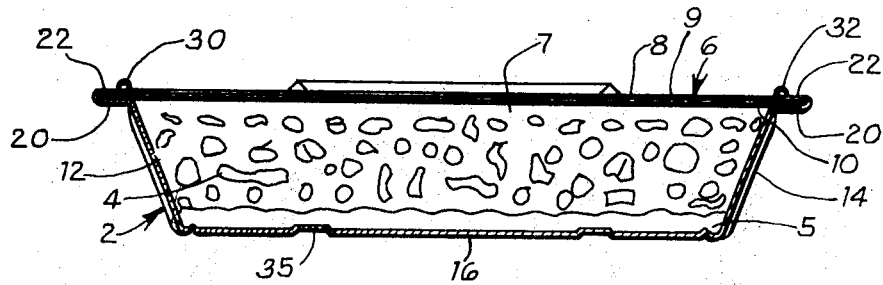
FIG. 2 is a side cutaway view of the composite frozen food container of this invention.
Figure 1:
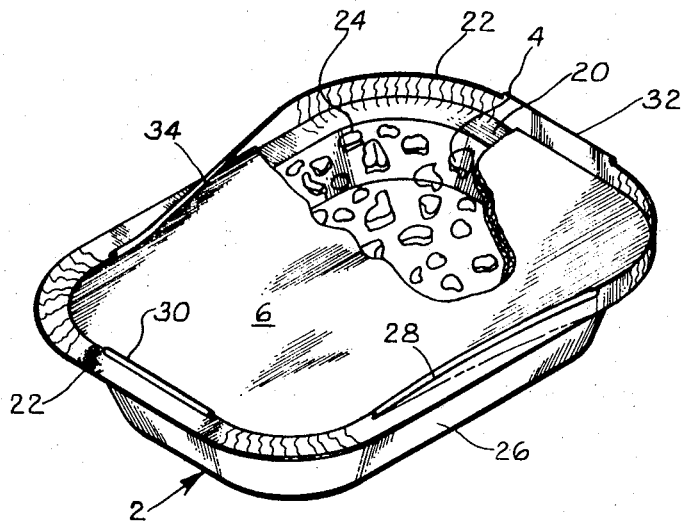
FIG. 1 is a top perspective view of the composite frozen food container of this invention.

Referring to FIGS. 1 and 2, it can be seen that the composite frozen food container 2 of this invention incorporates a foil metal tray which is formed from a bottom 16, end panels 12 and 14, and side panels 24 and 26.

The upper extremities of end panels 12 and 14 and side panels 24 and 26 are formed into lip 20 which is generally parallel with bottom 16. Positioned within lip 20 is a composite lid structure 6. Composite lid structure 6 is secured to lip 20 by bending the outer extremities of lip 20 over in a U-shaped fashion and thereby crimping the composite lid structure 6 into place. When the outer extremities of lip 20 are bent over so as to secure composite lid 6, a flange 22 is formed around the upper periphery of the frozen food container of this invention. For purposes of strengthening the container of this invention, flange 22 is provided with a plurality of ribs 28, 30, 32 and 34. While bottom 16 is provided with a groove 35.

Composite lid 6 is composed of a laminated material having an upper extremity 9 which can be, for example, bleached kraft paper which is suitable for printing and decorating, and a foil layer 10. Foil layer 10 can be, for example, aluminum foil on the order of 0.3 to 1 mil. in thickness. Due to the fact that composite lid 6 incorporates a foil layer 10, the heat energy which is being applied to bottom 16 tends to be reflected throughout the inner periphery of composite container 2. Because of this internal reflection, frozen vegetable particles 4 as contained on the inner periphery of composite container 2 tend to absorb this reflected radiation and hence are quickly heated to a palatable temperature. Likewise, foil layer 10 is advantageous in that it waterproofs the bottom extremity of composite lid structure 6. Lid 6 is crimped to such a degree as to insure sufficient sealing characteristics and thereby effect safety in shipping and storage to preserve the quality of the product. At the same time, lid 6 must be crimped such that it allows the release of steam from the package as the pressure is built up on heating the frozen container. Too complete a seal creates excessive pressure on heating and can cause bursting or an explosive action from the container as the steam pressure mounts, while insufficient sealing can create quality, stability, and handling problems.

Positioned in the bottom of composite container 2, adjacent to bottom 16, is a layer of cooking liquid 5 which generally protects the individual fresh frozen vegetables during the cooking sequence. A suitable cooking liquid 5 can comprise a critical amount of water. However a more preferred cooking liquid 5 consists of an edible oil emulsion, essential oils, spices, flavor ingredients, starches, gums, vitamins, and water. In addition to protecting the individual frozen good particles during the cooking sequence, cooking liquid 5 can likewise be utilized to impart flavor to vegetable particles 4.

Cooking liquid 5 can incorporate any suitable edible oil. Examples of suitable cooking oils are water per se or in conjunction with peanut oil, corn oil, various partially hydrogenated vegetable oils, shortenings, margarine, lard, butter, etc. The most preferred cooking oil for use in the cooking liquid in accordance with this invention is butter.

The only real requirement for an edible oil for use in conjunction with cooking liquid 5 is that the edible oil must have physical and chemical properties such that is does not tend to degrade or decompose at the temperatures which occur when bottom portion 16 of the frozen food package of this invention is placed over a direct heat source.

As is mentioned above, cooking liquid 5 comprises an emulsion of a cooking oil and water with spices an flavor ingredients being optionally added. The moisture content of the overall package of this invention must be very carefully controlled. Generally this moisture content must take into consideration the moisture content of the frozen food article which varies from vegetable to vegetable and from year to year. Likewise, this moisture content also must take into consideration the thermodynamic properties of the cooking liquid utilized. If the moisture content is too high, boilout will occur due to excess foaming and frothing on the inner periphery of the container of this invention. In contrast, if the moisture content is too low, degradation of the cooking oil used in cooking liquid 5 may occur and the frozen food particles may tend to char or burn.

Depending on the shape of the container, the depth of the frozen food packed in the container, adjustments in the moisture content of the cooking fluid may have to be made. In the experiments which follow, it should be noted that depending on the shape, depth, volume of frozen food in the container and the type of vegetable used, both the amount of cooking fluid and the composition of the cooking fluid may be varied to adjust for the overall moisture requirements and the required cooking characteristics. In a standard container, these variations are minimized and the adjustment is only for the variety of vegetable or the variation in moisture in a given lot of vegetable. In different size and shape containers, the depth, volume, heat distribution and penetration must also be taken into consideration. Generally, shallower containers are easier to heat. The greater the depth of the vegetables in the container, the harder is is to penetrate, heat, and arrive at the palatable state with the cooking fluid having penetrated throughout the interstices of the frozen vegetable particles. Whether the vegetables are frozen individually, or block frozen and then diced into discrete particles, the invention can be practiced as long as these discrete particles are maintained and the water vapor formed from the cooking fluid is able to penetrate into the interstices and open spaces to warm up the contents of the package. All of the optional ingredients, such as essential oils, spices, condiments, gums, salts, starches, etc., are a means of enhancing the flavor, aroma, and appearance of the frozen vegetable when it is ready to be consumed. The oil and water emulsion system, however, is the preferred form for cooking liquid 5. Its ratio of oil to water and the ratio of the cooking liquid to the frozen vegetable, however, is governed by the container measurements, vegetable type, and the desired end product.

In accordance with the broad aspects of this invention, cooking liquid 5 can have a composition as is specified in table 1.

The cooking liquid used in the present invention may have:

TABLE 1

From about 0 to about 75 percent cooking oil
From about 25 to about 100 percent water A more preferred range for the component of cooking liquid 5 is as specified in table 2.

TABLE 2

From about 25 to about 50 percent cooking oil
From about 50 to about 75 percent water A most preferred cooking liquid 5 for use in accordance with this invention is as specified in table 3.

TABLE 3

40 percent butter
60 percent water

It should be noted that in accordance with this invention, in addition to the specified in tables 1–3, cooking liquid 5 can contain salt, spices, and other flavor and sauce ingredients in amounts sufficient to enhance the flavor of the frozen food. More or less amounts of cooking liquid can be used with different vegetables, and container sizes and shapes to achieve the desired results.

When a heat source is applied to bottom 16, cooking liquid 5 is immediately heated up, due to the fact that it is adjacent to bottom 16. The moisture content of cooking liquid 5 quickly boils and is easily vaporized and tends to form steam throughout the inner periphery of container 2. This steam tends to increase the pressure on the inner periphery of container 2 to slightly above atmospheric pressure. This increase in pressure aids in the penetration and permeation of the individually frozen food particles 4 and accelerates the cooking. If the pressure on the inner periphery of composite container 2 should reach a critical level, lid 6 will be biased upwardly and will cause composite container 2 to rupture in such a fashion that the inner periphery of composite container 2 has access to the atmosphere.

The composite container 2 of this invention is adapted to utilize individually frozen food particles 4. This is to be contrasted with a conventional food freezing sequence wherein a frozen food is frozen in such a fashion that a solid mass of mass is joined together by ice crystals. If this solid mass of frozen food were utilized in this invention, steam produced by the cooking liquid 5 would not have access to the individually frozen food particles and would not have room to expand due to the fact that the frozen good particles would effectively block the escape of the stem upwardly. This unsafe condition would probably be followed by the rupturing of container 2 due to the increase in pressure. Likewise, in this situation food particles 4 would burn.

It is to be noted that an important aspect of the subject invention is that cooking liquid 5 is positioned on the bottom of the composite container 2 of this invention. When the composite container of this invention is placed over a direct heat source, cooking liquid 5 immediately starts to thaw or melt in such a fashion that immediate protection is given to frozen food particles 4 from burning or charring. In order to achieve the desired effect, cooking liquid 5 is positioned in the foil metal tray before the individual frozen food particles 4 are positioned therein. A more conventional packaging procedure would be to add the frozen vegetables to foil metal tray first followed by the application of a cooking liquid to the frozen food particles contained therein. However, if this reverse sequence were used in the subject invention, cooking liquid 5 would not be adjacent to bottom 16 during the first moments of the heating cycle. Before sufficient heat was transferred upwardly to melt the cooking liquid 5 and cause it to run down adjacent to bottom 16, those vegetables particles which are immediately adjacent the bottom 16 would be burned or charred. For this reason it is imperative that cooking liquid 5 be adjacent to bottom 16.

As is stated above, the amount of cooking liquid 5 utilized, the moisture content of the overall package and the positioning of this cooking liquid are critical in accordance with this invention. In connection with the amount of cooking liquid utilized, it is to be noted that if too much cooking liquid 5 is utilized or if its moisture content of the overall package is too high, cooking liquid 5 will tend to boil over out of composite container 2 and run down in the outside of container 2. In this manner, cooking liquid 5 comes into contact with the heat source where it is usually charred in such fashion as to create an objectionable situation.

Also in accordance with this invention the total void areas on the inner periphery of package 2 should be such that the internal pressure on the inner periphery of the composite frozen food container 2 increases slightly when the moisture content of cooking liquid 5 is converted to steam. This slight increase in pressure allows frozen food particles 4 to thaw and cook quickly. The void area as discussed in accordance with this invention is the total internal volume not occupied by frozen food particles 4 per se. This void is made up of the interstices between the individual particles of frozen food 4.

Vegetables for use in the present invention should be blanched to destroy any enzymatic activity present in the vegetables and then quickly frozen in the particle size desired for the package. Frozen vegetables for use in this invention should be placed in the container loosely, for example, they can be individually quick frozen, or frozen vegetables that have been chopped, diced or put in a form that will allow easy penetration into the interstices of the product. The loose particle state of the frozen vegetables insures the proper heating of the vegetable when placed on the heat source. The sauce, composed of the spices and flavoring ingredients and water can volatize and penetrate the interstices of the frozen vegetables heating the entire package equally without creating excessive pressure in the package.

In accordance with this invention, cooking liquid 5 should occupy from about 7 to about 25 percent of the internal volume of composite container 2. Frozen food particles 4 should occupy from about 75 to about 93 percent of this internal volume.

The frozen food 4 as used in the invention is cooked at medium to medium high temperatures of conventional stoves and reaches a palatable temperature in about 3 to about 30 minutes based on the size, shape and depth of the container. On a given standard size this time period is about one-half that occurring when the prior art packaging concepts are utilized.

When the heat source is removed from bottom 16, due to the fact that the tray is formed from a metal, the heat contained in the tray is quickly dispersed where by it is possible to handle the tray for serving in about 10 to 20 seconds after taking it away from the burner. All of consumer has to do is bend flange 22 into a vertical position in such a fashion that the removal of composite lid 6 is possible. Referring to FIG. 1, it can be seen how this removal of composite lid 6 is effected. In the left hand segment of FIG. 1 composite lid 6 is illustrated showing said lid fastened in positioned by flange 22. Conversely the right hand segment of FIG. 1 shows foil tray 2 wherein composite lid 6 can be removed as flange 22 has been bent into a vertical position.

From FIGS. 1 and 2 it can be seen that after composite lid 6 is removed the composite frozen food package of this invention is readily adapted for serving and general use.

The following examples will illustrate the subject invention. These examples are given for the purpose of illustration and not for purposes of limiting this invention. (All parts percent are given by weight unless otherwise specified.)

EXAMPLES

The date for examples 1 to 24 is illustrated in table IV. In examples 6 to 24 the cooking liquid contained additional ingredients such as starch, salt, sugar, spices, flavorings, etc., to enhance the flavor and aroma of the prepared food.

TABLE IV

| Example | Frozen vegetable | Cooking fluid | Oil phase | Water phase | Cooking liquid | Frozen vegetable | |
|---|---|---|---|---|---|---|---|
| 1 | Corn | None | | | | 100 | Contents of package charred at the bottom on heating over the stove on medium high heat for 10 minutes. |
| 2 | Cut beans | do | | | | 100 | Do. |
| 3 | Corn | Water | 0 | 100 | 7.5 | 92.5 | Contents slightly charred and burned at the bottom on heating over the stove at medium high heat for 10 minutes. |
| 4 | do | do | 0 | 100 | 15 | 85 | Contents of package cooked well but the products lacked flavor and seasoning; there was a slight amount of boil out. |
| 5 | Cut beans | do | 0 | 100 | 15 | 85 | Do. |
| 6 | Corn | Butter and water | 50 | 50 | 16 | 84 | Contents of package cooked well without charring or boil out. Product is delicious and flavorful. |
| 7 | Cut beans | do | 50 | 50 | 16 | 84 | Do. |
| 8 | Corn | do | 40 | 60 | 13 | 87 | Do. |
| 9 | Cut beans | do | 40 | 60 | 13 | 87 | Do. |
| 10 | Corn | do | 30 | 70 | 10 | 90 | Do. |
| 11 | Cut beans | do | 30 | 70 | 10 | 90 | Do. |
| 12 | Corn | Vegetable shortening | 100 | 0 | 15 | 85 | Contents of package charred at the bottom on heating over the stove on medium high heat for 10 minutes. |
| 13 | Cut beans | do | 100 | 0 | 15 | 85 | Do. |
| 14 | Corn | Vegetable shortening and water | 50 | 50 | 15 | 85 | Contents of package cooked well without charring or boil out. |
| 15 | Cut beans | do | 50 | 50 | 15 | 85 | Do. |
| 16 | Corn | Margarine oil | 100 | 0 | 15 | 85 | Contents of package charred at the bottom on heating over the stove on medium high heat for 10 minutes. |
| 17 | Cut beans | do | 100 | 0 | 15 | 85 | Do. |
| 18 | Corn | do | 50 | 50 | 15 | 85 | Contents of package cooked well without charring or boil out. |

| Example | Frozen vegetable | Cooking fluid | Percent | | | | |
|---|---|---|---|---|---|---|---|
| | | | Oil phase | Water phase | Cooking liquid | Frozen vegetable | |
| 19 | Cut beans | do | 50 | 50 | 15 | 85 | Do. |
| 20 | Corn | Liquid vegetable oil | 100 | 0 | 15 | 85 | Contents of package charred at the bottom on heating over the stove on medium high heat for 10 minutes. |
| 21 | Cut beans | do | 100 | 0 | 15 | 85 | Do. |
| 22 | Corn | do | 50 | 50 | 15 | 85 | Contents of package cooked well without charring or boil out. |
| 23 | Cut beans | do | 50 | 50 | 15 | 85 | Do. |
| 24 | Chopped broccoli | Butter and water | 50 | 50 | 7 | 93 | Do. |

The data for examples 25 to 28 is illustrated in table V. In these examples frozen peas were used as the common media and various types of aluminum trays were used to illustrate the feasibility of the concept with trays of various sizes, shapes and depths. In each case a sauce composed of water, butter, starch, sugar, salt, monosodium glutamate, spices and a colloid, such as a gum, were prepared ahead of time and placed at the bottom of each type of tray. The amount of sauce was varied and sufficient sauce was used to cover the bottom surface. Then the frozen peas were added on top of the sauce. The amount of peas was varied. The package was then covered with the laminated composite lid and the sides of the aluminum were crimped into place as described in this invention. The products were maintained in the frozen state until ready for reconstitution and use. In each case, the cooking liquid was placed in the tray first followed by the frozen peas. When the resulting frozen package was placed over a stove and heated at medium high heat this procedure resulted in delicious, ready to serve green peas with a flavor and aroma most acceptable for household use.

TABLE V

| Example | Tray size in oz. | Net wt. of contents in oz. | Percent | | Cook time, min. | Tray depth ins. |
|---|---|---|---|---|---|---|
| | | | Cooking liquid | Froz. veg. | | |
| 25 | 15½ | 10.00 | 10 | 90 | 10 | 1 5/16 |
| 26 | 40 | 25.80 | 10 | 90 | 20 | 2½ |
| 27 | 45 | 29.10 | 10 | 90 | 16 | 2 |
| 28 | 50 | 32.22 | 10 | 90 | 13 | 1 5/8 |

Example

Example 25 was repeated using a butter cooking liquid, the composition of which was as follows:

| Water | 56.1% |
| Butter Oil | 27.0 |
| Waxy Maize Starch | 7.1 |
| Sugar, granulated | 3.8 |
| Salt, granulated | 3.5 |
| Modified Food Starch | 1.2 |
| Hydrolyzed Protein Flavor | 0.9 |
| Monosodium glutamate | 0.4 |

100.0%

In each case the cooking liquid was first introduced at the bottom of the tray and covered the entire bottom surface of the tray before the frozen vegetables were placed on top. The results were similar to those described in connection with example 25.

EXAMPLE

Example 29 was repeated using a sauce of the following formula:

| Water | 63.0% |
| Hydrogenated Vegetable Oil | 23.0 |
| Waxy Maize Starch | 5.5 |
| Sugar, granulated | 3.0% |
| Salt, granulated | 3.0 |
| Food Starch | 0.5 |
| Hydrolyzed Protein | 0.7 |
| Butter Flavor | 0.5 |
| Monosodium glutamate | 0.3 |
| Monoglyceride | 0.3 |
| Lecithin | 0.2 |

100.0%

The results were similar to those described in connection with example 25.

EXAMPLE

Using a 15½ oz. aluminum tray, water as the cooking fluid was placed at the bottom of the tray to form a bottom layer. Peas as discrete particles were placed on top of the water layer and a thickened cream sauce was placed on top of the vegetables. The lid was then crimped into place. The package was placed in the freezer for future use. The product as prepared had 9 percent water added, 73 percent vegetables, and 18 percent sauce. When the frozen product was taken out of the freezer and heated at medium heat for 15 minutes, a most satisfactory, ready to eat vegetable resulted.

EXAMPLE

Example 31 was repeated without the addition of 9 percent water to the bottom of the tray before the vegetable addition. The results were not satisfactory. The Example were charred at the bottom which altered both the taste and the appearance of the resulting heated vegetable.

EXAMPLE 90 parts of sweet peas were placed over a bottom layer of 7 percent of cooking fluid (constituting a 6 to 1 water to butter oil ratio) containing appropriate spicing and flavoring agents along with tapioca starch, sugar, salt, etc. which constituted the remaining 3 percent of the net contents of the 10 oz. aluminum tray.

The composite cover was crimped in place and the entire package stored in the deep freezer until ready for use. Several weeks later, when the product was taken from deep freeze and placed on a stove at medium high heat, a most delectable and satisfactory product was obtained after 12 minutes of heating.

We claim:
1. A frozen food package comprising:
a bottom layer of frozen cooking liquid;
an upper layer of frozen vegetables in discrete individual particle from superposed above and in contact with said frozen cooking liquid;
a foil metal tray having a bottom wall with a top surface covered entirely by said frozen cooking liquid, said tray having sidewalls integrally attached to said bottom wall; and,
a lid crimpedly mounted to said sidewalls providing a seal for said container, said seal being self-breakable when vapor pressure within said package reaches a predetermined level.
2. The package of claim 1 wherein:
said lid has a heat reflective metal wall facing said bottom wall and a printed paper wall mounted atop said reflective metal wall; and,
said sidewalls have upper extremities forming a flange generally parallel with said bottom wall, said flange is sealingly crimped to said lid, said bottom wall is flat.

3. The frozen food package of claim 2, wherein said package contains from about 75 percent to about 93 percent frozen vegetables and from about 7 percent to about 25 percent cooking liquid.

4. The frozen food package of claim 3 wherein the cooking liquid is water.

5. The frozen food package of claim 3 wherein the cooking liquid consists of from about 25 to about 50 percent of an edible oil, from 50 percent to 75 percent water and trace amounts of flavoring agents and spices.

6. The frozen food package of claim 5 wherein the edible oil is butter.

7. The frozen food package of claim 5 wherein the cooking liquid consists of about 40 percent butter and about 60 percent water.

8. The frozen food package of claim 3 wherein the cooking liquid consists of from about 25 to 50 percent oil and from about 50 to 75 percent water.

9. A frozen food package comprising: a bottom layer of frozen cooking liquid in an approximate amount of 7 percent to 25 percent of the volume of said product, said liquid having fatty emulsion, water and spices therein;

an upper layer of individual quick frozen vegetables superposed above and in contact with said frozen cooking liquid;

a foil metal tray having a flat bottom wall with a top surface and a bottom surface, said top surface being covered completely with said frozen cooking liquid, said bottom surface being directly engageable with a direct heat source, said tray having a pair of opposing angularly disposed end walls and a pair of angularly disposed sidewalls integrally attached to said bottom wall;

a crimpable metal flange parallel with said bottom wall being integrally mounted atop said end walls and said sidewalls; and, a composite lid mounted to said tray by said flange forming a seal, said seal being self-breakable when vapor pressure within said package reaches a certain level.

10. A method of preparing a frozen food package comprising the steps of:

filling a metal foil tray with a cooking liquid so as to cover the entire bottom interior surface of said tray;

freezing said cooking liquid;

preparing vegetables into discrete individual pieces;

blanching said vegetables destroying any enzymatic activity in said vegetables; freezing said vegetables subsequent to said blanching step;

placing said frozen vegetables in said tray and on top of said frozen cooking liquid;

mounting a composite lid on top of said tray;

crimpedly sealing said lid to said tray so said lid will separate from said tray upon attainment of a predetermined vapor pressure within said package; and, placing said package in a freezer.

11. The method of claim 10 additionally comprising the steps of:

cutting said vegetables into discrete individual pieces prior to said blanching step; removing said package from said freezer;

heating the bottom of said tray having said frozen cooking liquid and vegetables therein;

removing said lid from said tray subsequent to the completion of said heating step;

serving said vegetables in said tray to a consumer immediately subsequent to said removing step; and wherein, approximately 7 percent to 25 percent by volume of said tray is filled with said cooling liquid; and, said tray has a flat bottom.

* * * * *